(12) United States Patent
Wallgren et al.

(10) Patent No.: US 10,941,540 B2
(45) Date of Patent: Mar. 9, 2021

(54) ADJUSTABLE OPERATOR CONSOLE FOR MACHINE CONTROL

(71) Applicant: Caterpillar Inc., Deerfield, IL (US)

(72) Inventors: Jon P. Wallgren, Washington, IL (US); Andrew Gates, Edwards, IL (US); Jason Dare, Peoria, IL (US); Lalit S. Deshpande, Dunlap, IL (US); Ian Tiggemann, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 40 days.

(21) Appl. No.: 16/262,092

(22) Filed: Jan. 30, 2019

(65) Prior Publication Data

US 2020/0240109 A1 Jul. 30, 2020

(51) Int. Cl.
| | |
|---|---|
| *E02F 9/20* | (2006.01) |
| *G05G 1/62* | (2008.04) |
| *B60N 2/75* | (2018.01) |
| *B60N 2/90* | (2018.01) |
| *G05G 1/01* | (2008.04) |

(52) U.S. Cl.
CPC ............ *E02F 9/2004* (2013.01); *B60N 2/767* (2018.02); *B60N 2/77* (2018.02); *B60N 2/773* (2018.02); *B60N 2/919* (2018.02); *G05G 1/01* (2013.01); *G05G 1/62* (2013.01); *B60N 2002/952* (2018.02)

(58) Field of Classification Search
CPC ........... E02F 9/2004; G05G 1/62; G05G 1/01; B60N 2/919; B60N 2/77; B60N 2/767; B60N 2/773; B60N 2002/952
See application file for complete search history.

(56) References Cited

U.S. PATENT DOCUMENTS

| | | | |
|---|---|---|---|
| 5,244,066 A | 9/1993 | Mackoway et al. | |
| 7,172,050 B2 | 2/2007 | Amamiya | |
| 7,878,288 B2 | 2/2011 | Kostak et al. | |
| 9,058,052 B2 * | 6/2015 | Bruns | A47C 7/54 |
| 2004/0140145 A1 * | 7/2004 | Chernoff | B60N 2/797 180/333 |
| 2005/0006942 A1 * | 1/2005 | Bremner | B60N 2/77 297/411.36 |
| 2006/0042857 A1 * | 3/2006 | Catton | B60N 2/77 180/334 |

(Continued)

FOREIGN PATENT DOCUMENTS

| | | | |
|---|---|---|---|
| JP | 2002073187 A | * | 3/2002 |
| JP | 2002073187 A | | 3/2002 |

*Primary Examiner* — Drew J Brown
(74) *Attorney, Agent, or Firm* — Harrity & Harrity LLP

(57) ABSTRACT

An adjustable operator console for machine control is disclosed. The operator console may include a mount with a mount bracket configured to be mounted to an operator station of a machine and a control mount configured to support a control unit. The control unit may be configured to control an operation of a component of the machine. The mount may include an armrest bracket configured to support an armrest, an armrest mount configured to support the armrest bracket, a first actuator control configured to permit an adjustment to a position of the armrest relative to the control mount, and a second actuator control configured to permit an adjustment to a position of the armrest and the control unit relative to the operator station of the machine.

18 Claims, 7 Drawing Sheets

(56) References Cited

U.S. PATENT DOCUMENTS

| | | | |
|---|---|---|---|
| 2007/0017728 A1* | 1/2007 | Sano | B60N 2/773 |
| | | | 180/334 |
| 2008/0277991 A1* | 11/2008 | Liu | B60N 2/773 |
| | | | 297/411.36 |
| 2014/0183923 A1* | 7/2014 | Itzinger | B64D 11/06 |
| | | | 297/411.38 |
| 2017/0217343 A1* | 8/2017 | Klieber | B60N 2/929 |
| 2017/0275851 A1* | 9/2017 | Huber | B60N 2/797 |
| 2018/0002893 A1* | 1/2018 | Heinzmann | E02F 3/96 |
| 2018/0112372 A1* | 4/2018 | Kato | E02F 9/20 |
| 2018/0201165 A1 | 7/2018 | Rekow et al. | |

* cited by examiner

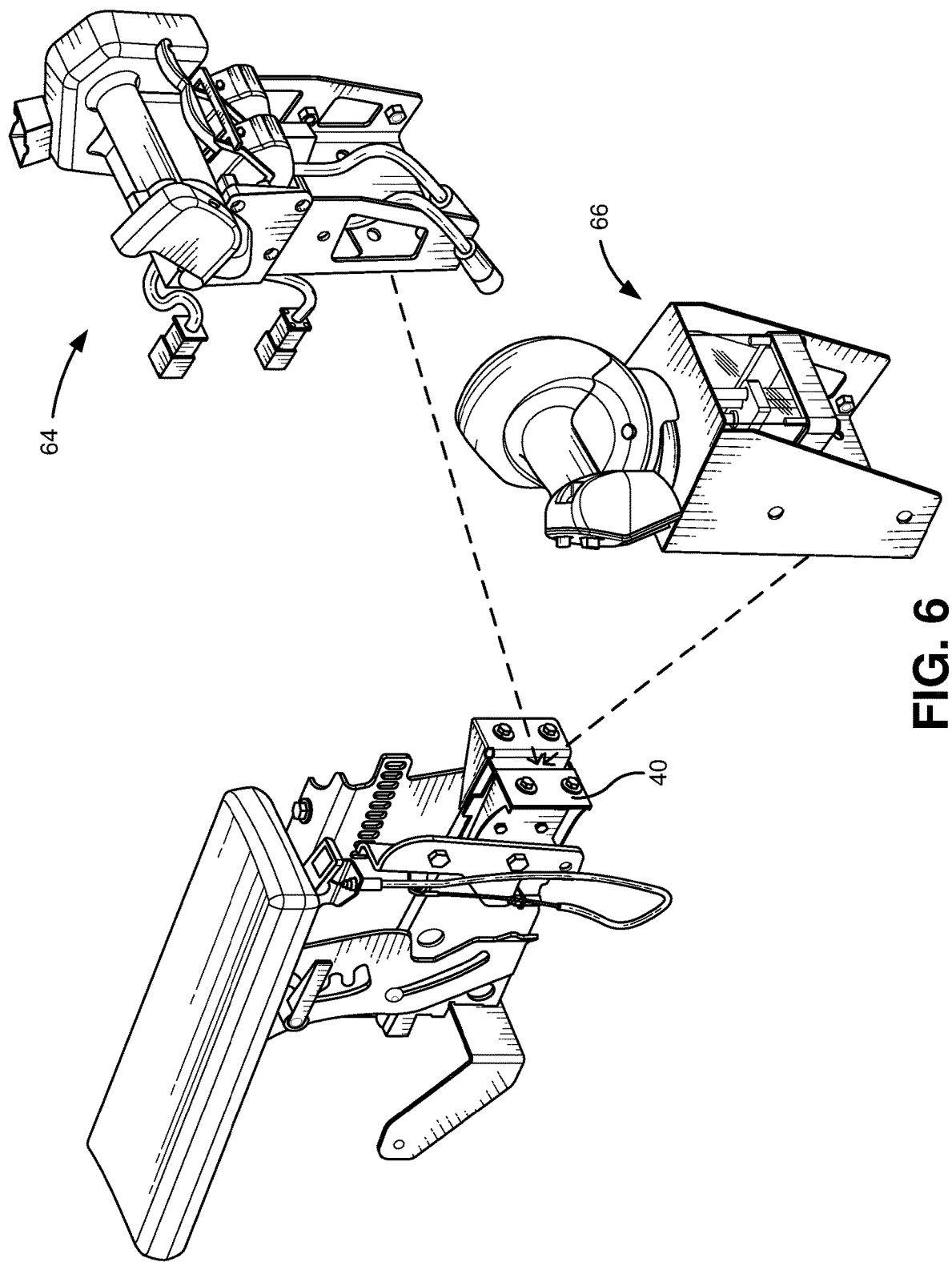

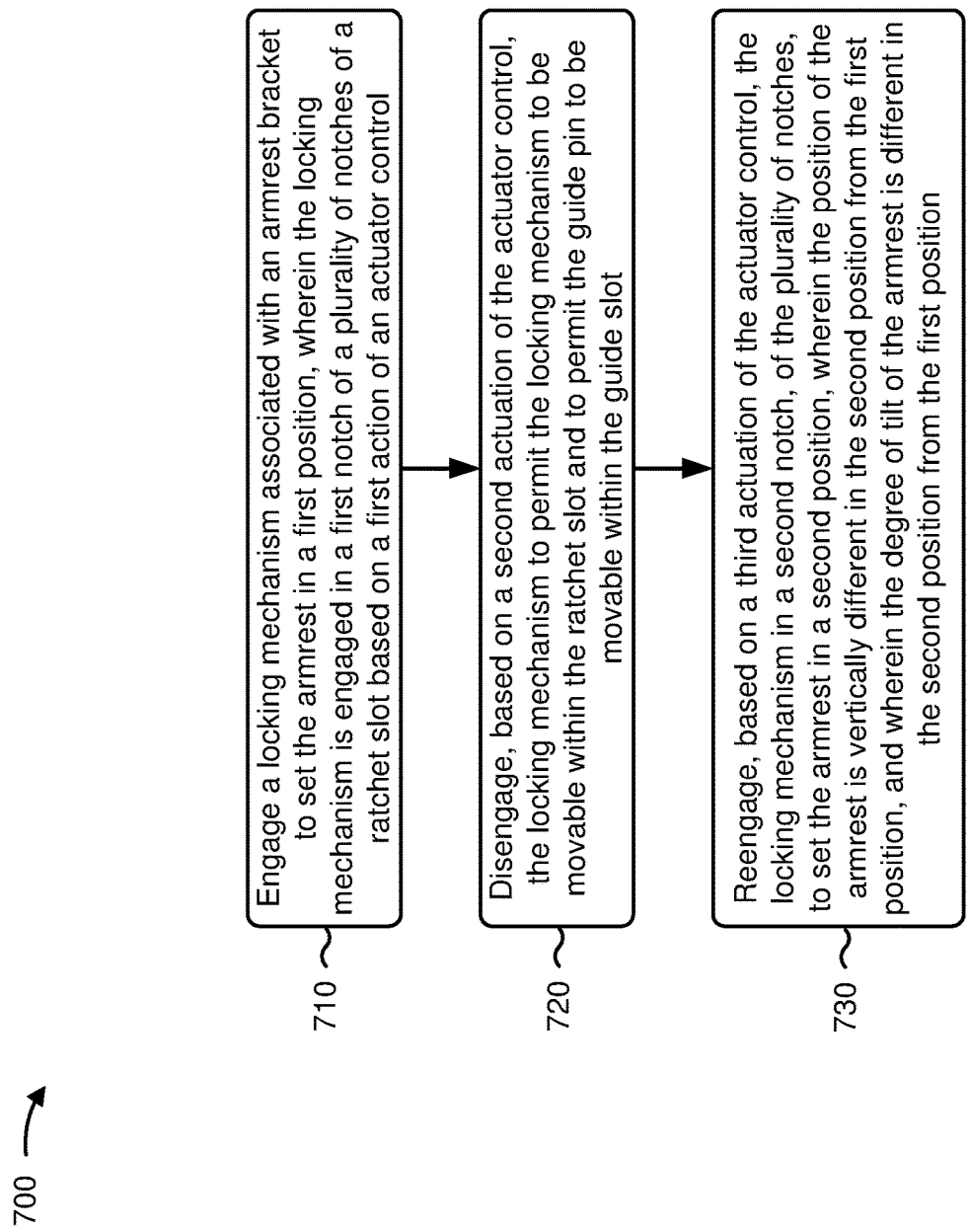

ADJUSTABLE OPERATOR CONSOLE FOR MACHINE CONTROL

TECHNICAL FIELD

The present disclosure relates generally to an operator station and, more particularly, to an adjustable operator console.

BACKGROUND

An operator console for a machine, such as a track type tractor or other type of earth-moving machine, can be configured within an operator station as a set of fixed components. Such fixed components may include an armrest configured to provide support for an arm of an operator while the operator operates controls of the machine. Such a relatively fixed configuration of the armrest and/or controls can cause one or more problems involving an operator operating the machine in an uncomfortable position. For example, the fixed configuration may prevent ergonomic positioning of one or more controls of the operator console for the operator.

One approach that describes an armrest with an "ergonomic position" is disclosed in U.S. Patent Publication No. 2018/0201165 that published on Jul. 19, 2018 ("the '165 publication"). In particular, the '165 publication describes one or more control implements coupled to an upper support section that selectably release or restrain the armrest between ergonomic positions.

While the '165 publication may describe "ergonomic positions" and "control implements," the '165 publication does not describe adjusting positioning of an armrest relative to one or more controls.

The operator console of the present disclosure solves one or more of the problems set forth above and/or other problems in the art.

SUMMARY

According to some implementations, the present disclosure is related to an operator console that may include an armrest configured to support an arm of an operator; a control unit configured to control a component of a machine; and a mount unit. The mount unit may include a mount bracket configured to be mounted to an operator station of the machine; a control mount configured to support the control unit; an armrest bracket configured to support the armrest; an armrest mount configured to support the armrest bracket; a first actuator control configured to permit an adjustment to a position of the armrest relative to the control unit; and a second actuator control configured to permit an adjustment to a position of the armrest and the control unit relative to the operator station of the machine.

According to some implementations, the present disclosure is related to a mount for an operator console; a mount bracket configured to be mounted to an operator station of a machine; a control mount configured to support a control unit, wherein the control unit is configured to control an operation of a component of the machine; an armrest bracket configured to support the armrest; an armrest mount configured to support the armrest bracket; a first actuator control configured to permit an adjustment to a position of the armrest relative to the control mount; and a second actuator control configured to permit an adjustment to a position of the armrest and the control unit relative to the operator station of the machine.

According to some implementations, the present disclosure is related to a method that may include engaging a locking mechanism associated with an armrest bracket to set the armrest in a first position. The armrest bracket may be configured to support the armrest. The armrest bracket may include a guide slot configured to permit a guide pin of an armrest mount to slide within the guide slot. The guide slot may be configured to adjust a degree of tilt of the armrest based on a location of the guide pin within the guide slot, and the armrest mount may support the armrest bracket via the guide pin and the locking mechanism. The armrest bracket may include a ratchet slot that includes a plurality of notches. The locking mechanism may be engaged in a first notch of the plurality of notches based on a first actuation of an actuator control. The method may include disengaging, based on a second actuation of the actuator control, the locking mechanism to permit the locking mechanism to be movable within the ratchet slot and to permit the guide pin to be movable within the guide slot. The method may include reengaging, based on a third actuation of the actuator control, the locking mechanism in a second notch, of the plurality of notches, to set the armrest in a second position. The position of the armrest may be vertically different in the second position from the first position, and/or the degree of tilt of the armrest may be different in the second position from the first position.

BRIEF DESCRIPTION OF THE DRAWINGS

FIG. 6 is a diagram illustrating an example manner in which interchangeable control units may be integrated with the mount of FIG. 4.

FIG. 7 is a flowchart of an example process associated with an adjustable operator console, as described herein.

DETAILED DESCRIPTION

Figure 1:
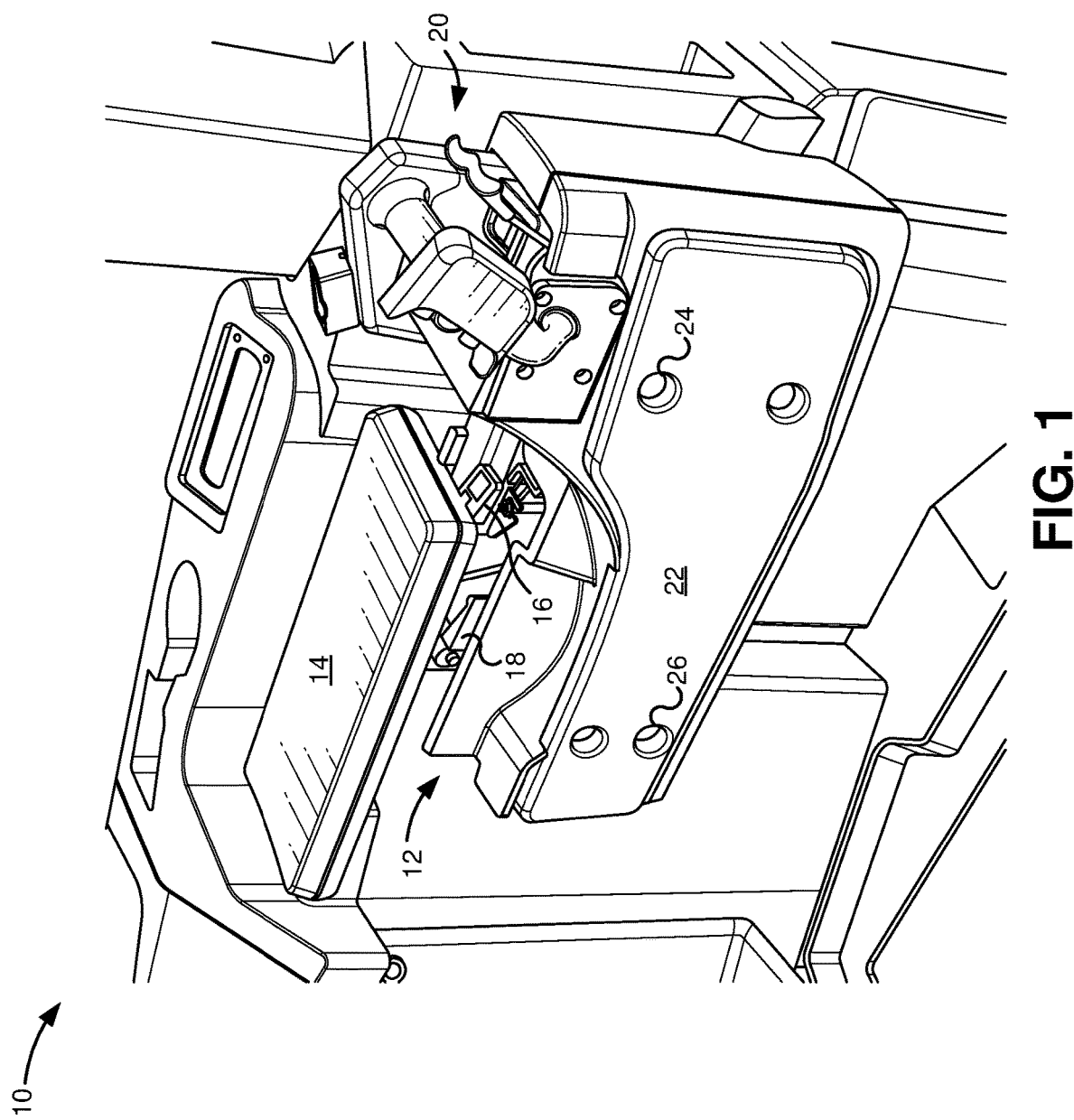
FIG. 1 is a diagram of an example operator station that includes an operator console.

FIG. 1 is a diagram of an example operator station 10 that includes an operator console 12. Operator console 12 may be mounted to a structure of operator station 10. Operator station 10 may be included within a fixed or mobile machine that performs some type of operation associated with an industry, such as mining, construction, farming, transportation, or the like. For example, the machine may be a track type tractor, that includes one or more components (e.g., steering, a blade, a winch, a ripper, and/or the like). Operator console 12 may be mounted near or adjacent to an operator support, such as an operator seat or operator harness within operator station 10, to permit an operator to utilize operator console 12 while operating the machine.

Operator console 12 may include an armrest 14 that is situated or configured to support an arm of the operator. A length of armrest 14 may be, for example, 15 centimeters (cm) to 40 cm. According to some implementations, overall dimensions of operator console may have, for example, a length less than 60 cm, a height less than 30 cm, and/or a width (or depth) less than 15 cm.

A locking mechanism 16 may be an element of a first actuator control to adjust a position of armrest 14, as described herein. A lever 18 may be an element of a second actuator control to adjust a position of operator console 12 within operator station 10, as described herein. Further, operator console 12 may include a control unit 20 configured to control the machine and/or one or more components of the machine. A housing 22 of operator console 12 may enclose a portion of control unit 20 and one or more elements of armrest 14. Housing 22 may be fixed to operator console 12 via one or more fasteners 24 (e.g., screws, bolts, and/or the like).

Figure 2:
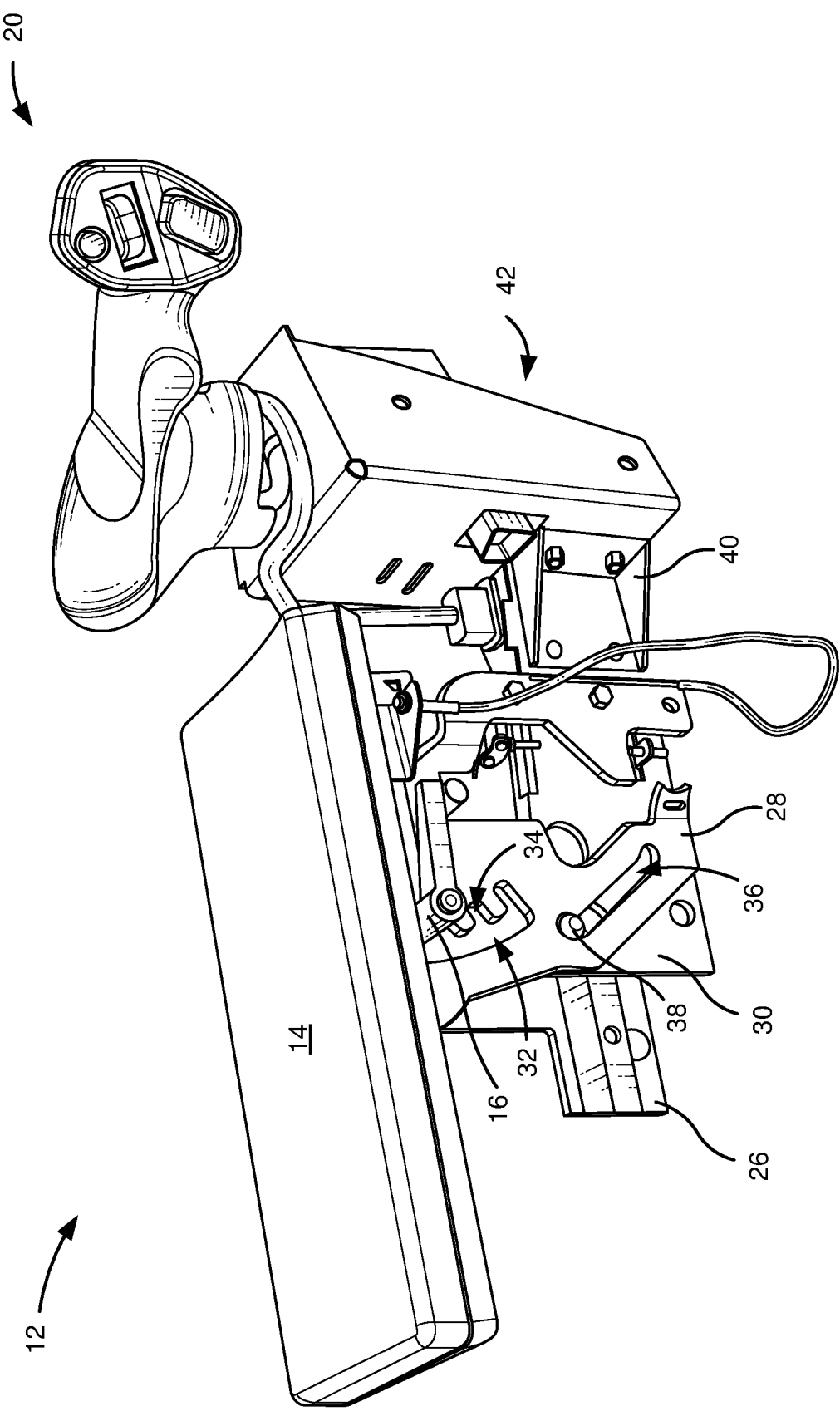
FIG. 2 is a diagram of an example operator console that may be used with the operator station of FIG. 1.

FIG. 2 is a diagram of an example operator console 12 that may be used with an operator station, such as operator station 10 of FIG. 1. Operator console 12 of FIG. 2 is shown without housing 22. As shown in FIG. 2, operator console 12 may include a mount bracket 26, an armrest bracket 28, and an armrest mount 30. Mount bracket 26 may be mounted to operator station 10 to permit operator console 12 to be attached to operator station 10. Armrest bracket 28 may support armrest 14 (e.g., by being fastened to armrest 14) using any suitable mechanism. Armrest bracket 28 may include a ratchet slot 34 that includes a plurality of notches 34. Furthermore, armrest bracket 28 may include a guide slot 36. A guide pin 38 may be fixed to armrest mount 30 and be movable within guide slot 36 to permit a position of armrest 14 to be adjusted relative to control unit 20. Further, armrest mount 30 may be configured to receive locking mechanism 16. For example, locking mechanism 16 may be a threaded bolt, and armrest mount 30 may include an opening (e.g., a threaded opening) that fits locking mechanism 16. Additionally, or alternatively, locking mechanism 16 may include one or more other types of bolts, screws, pins (e.g., a spring-loaded pin), and/or the like.

Locking mechanism 16 may pass through ratchet slot 32 and be configured to provide a clamping force on armrest bracket 28 when tightened to armrest bracket 28 and/or engaged with armrest mount 30. Accordingly, ratchet slot 32 may receive locking mechanism 16, such that locking mechanism 16 (e.g., when loosened from armrest bracket 28 or disengaged from armrest mount 30) is movable within ratchet slot 32 to permit locking mechanism 16 to be positioned within one or more of the notches 36.

Operator console 12 may include a control mount 40 configured to support control unit 20. Control mount 40 may be attached to and/or configured as a part of armrest mount 30. As shown in FIG. 2, control unit 20 may be a different type of control unit than control unit 20 of FIG. 1. Accordingly, control unit 20 may be interchangeable such that one or more different types of control units can be mounted to and/or supported by control mount 40. The one or more different types of control units may include a control unit frame 42 that is a same type and/or configuration that permits control unit 20 to be mounted to and/or supported by control mount 40. In some implementations, control mount 40 includes one or more brackets configured to receive one or more fasteners attached to control unit frame 42 to support control unit 20.

Figure 3:
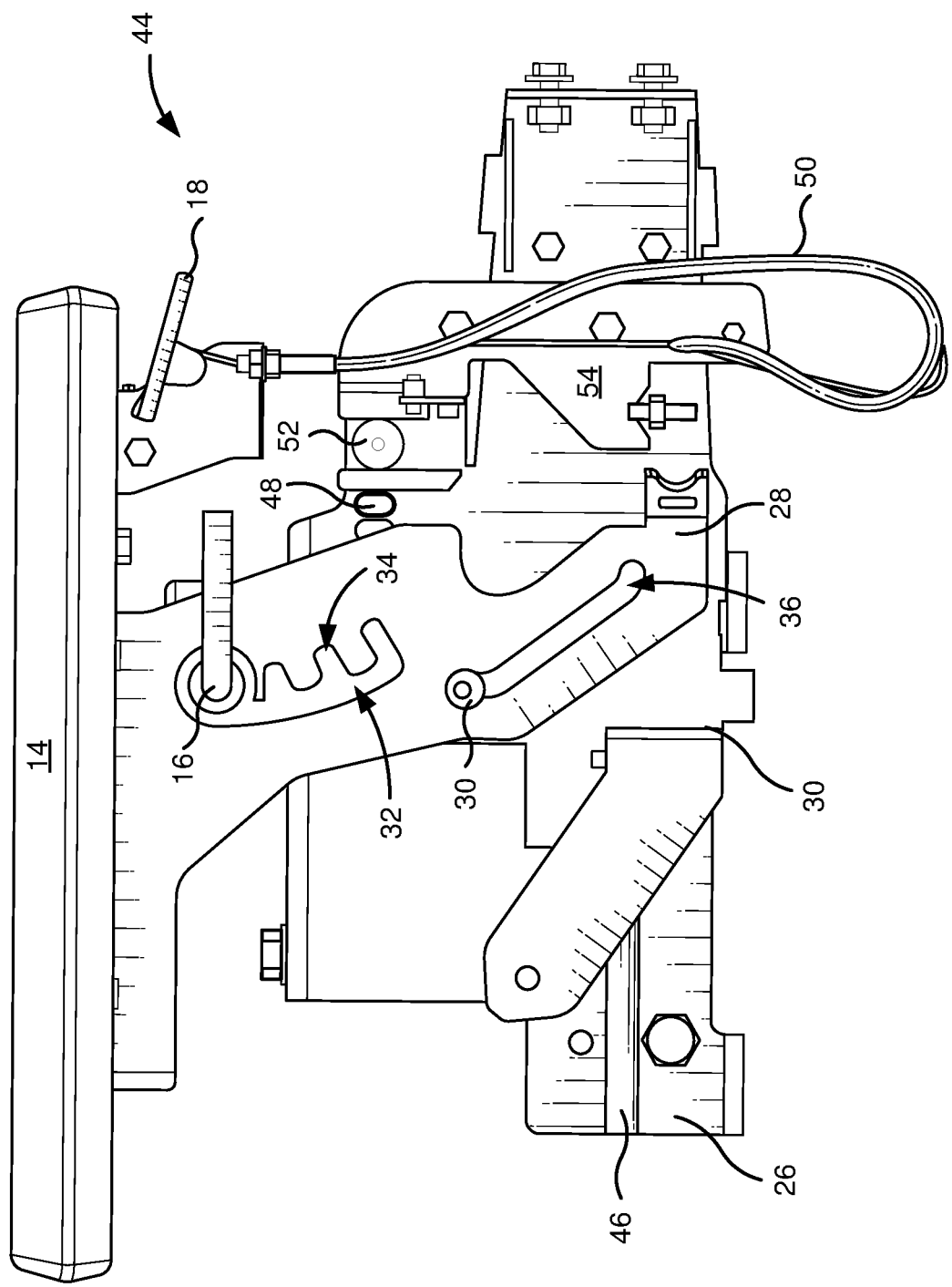
FIG. 3 is a plan view of an example mount unit that may be used with the operator console of FIG. 2.

FIG. 3 is a plan view of an example mount unit 44 that may be used with the operator console 12 of FIG. 2. As shown in FIG. 3, mount bracket 26 may include a slide rail 46 and a plurality of linear slots 48. Armrest mount 30 may fit and/or be coupled with slide rail 46 to permit armrest mount 30 to be movable along slide rail 46.

As further shown in FIG. 3, an actuator control that includes lever 18 may include a cable 50 and a slide pin 52. Lever 18 may be connected to cable 50 at a lever end of cable 50, and slide pin 52 may be connected to cable 50 at a locking end of cable 50. In some implementations, the locking end of cable 50 is connected to a locking bracket. In such cases, slide pin 52 may be engaged and/or disengaged from slots 48, of mount bracket 26, via the locking bracket.

Slide pin 52 may be configured to fit within one or more of slots 48. Accordingly, when engaged (e.g., when one of the slots 48 receives slide pin 52), slide pin 52 locks operator console 12 in place, relative to operator station 10. When disengaged (when slide pin 52 is not received by any of slots 48), operator console 12 may be movable along slide rail 46. Slide rail 46 may permit linear movement of operator console 12. Such linear movement may be forward linear movement or backward linear movement relative to operator station 10 and/or a machine associated with operator station 10. In some implementations, slide rail 46 may be configured to be substantially horizontal or parallel to an operator support and/or a surface (e.g., a base surface or floor) of operator station 10.

Figure 4:
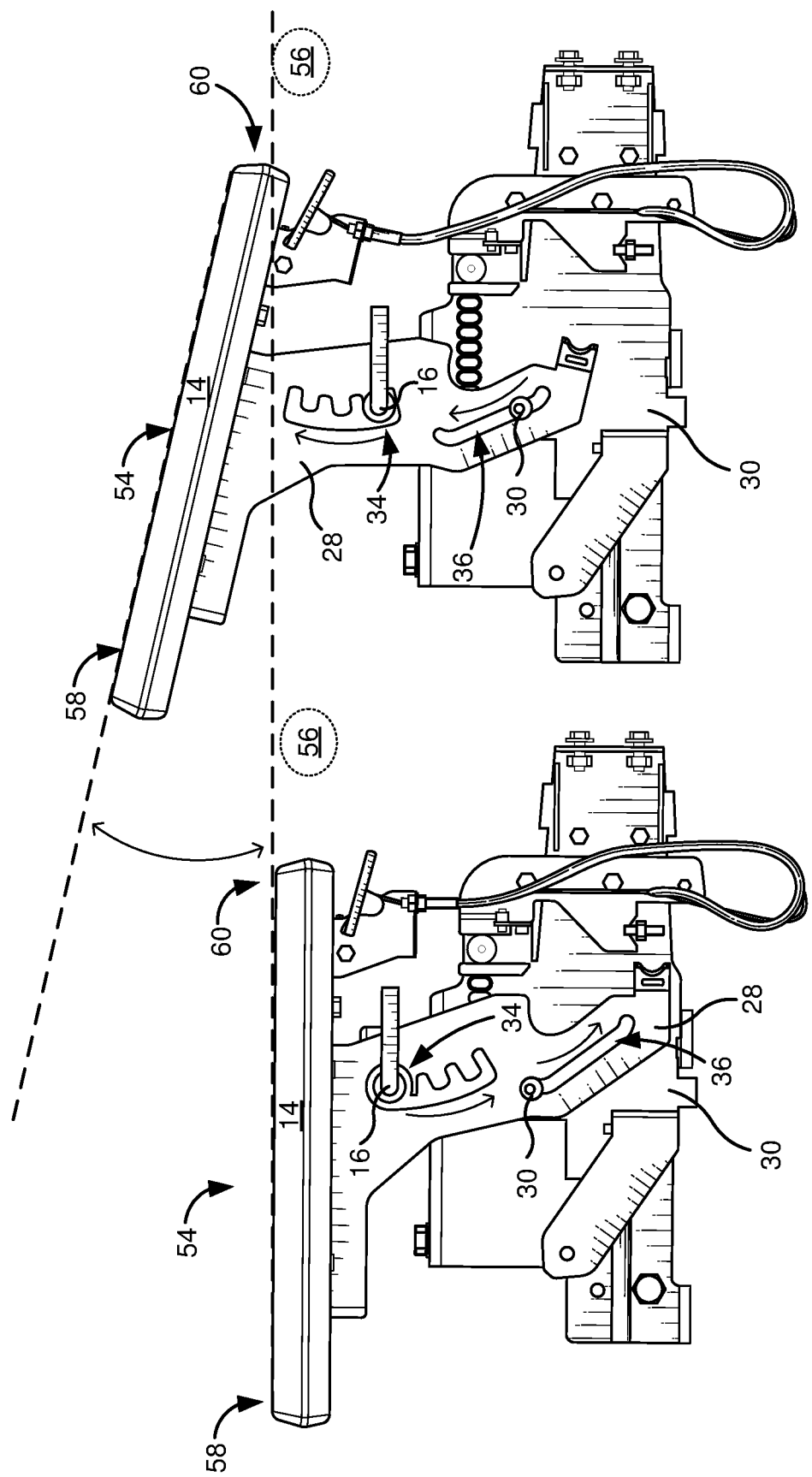
FIG. 4 is a diagram of an example actuation of an armrest of the operator console of FIG. 2.

FIG. 4 is a diagram of an example actuation of armrest 14 of operator console 12 of FIG. 2. The actuation of armrest 14 may be enabled by a first actuator control of operator console 12 that includes or interacts with locking mechanism 16. As shown in FIG. 4, armrest 14 can be adjusted to multiple positions between, for example, a first position (as shown on a left side of FIG. 4) and a second position (as shown on a right side of FIG. 4). Such positions may be determined and/or defined by which notch 36 receives locking mechanism 16. For example, which notch 36 includes locking mechanism 16 may determine a vertical position of armrest 14. In some implementations, the vertical position may be relative to operator station 10 and/or mount bracket 26. As shown in FIG. 4, a tilt position of armrest 14 may be based on a location of guide pin 32 within guide slot 36. Accordingly, an angle or degree of tilt of armrest 14 may be based on the configuration (e.g., a slope) of guide slot 36. In some implementations, the degree of tilt may be configured to align a top surface 54 of armrest 14 with a hand position 56 of the control unit 20 (not shown in FIG. 4), regardless of the vertical position of armrest 14 (and/or armrest bracket 28). A top surface 54 may include an elbow end 58 and a hand end 60. In other words, an operator's wrist and elbow, when using control unit 20, can be supported regardless of an arm angle of the user.

According to some implementations, to adjust armrest 14 between the first position and the second position, locking mechanism 16, when actuated to adjust (e.g., loosen) armrest 14, is disengaged from notch 36 and/or can be moved within the ratchet slot between notches 36. Additionally, or alternatively, locking mechanism 16, when actuated to set the position of armrest 14 (e.g., tightened), can be engaged within notches 36 to set the vertical position and/or tilt position of armrest 14. Locking mechanism 16, when actuated to set the position of armrest 14, applies a clamping force on armrest bracket 28 to set the vertical position and the tilt position of armrest 14, relative to hand position 56 and/or control unit 20.

Figure 5:
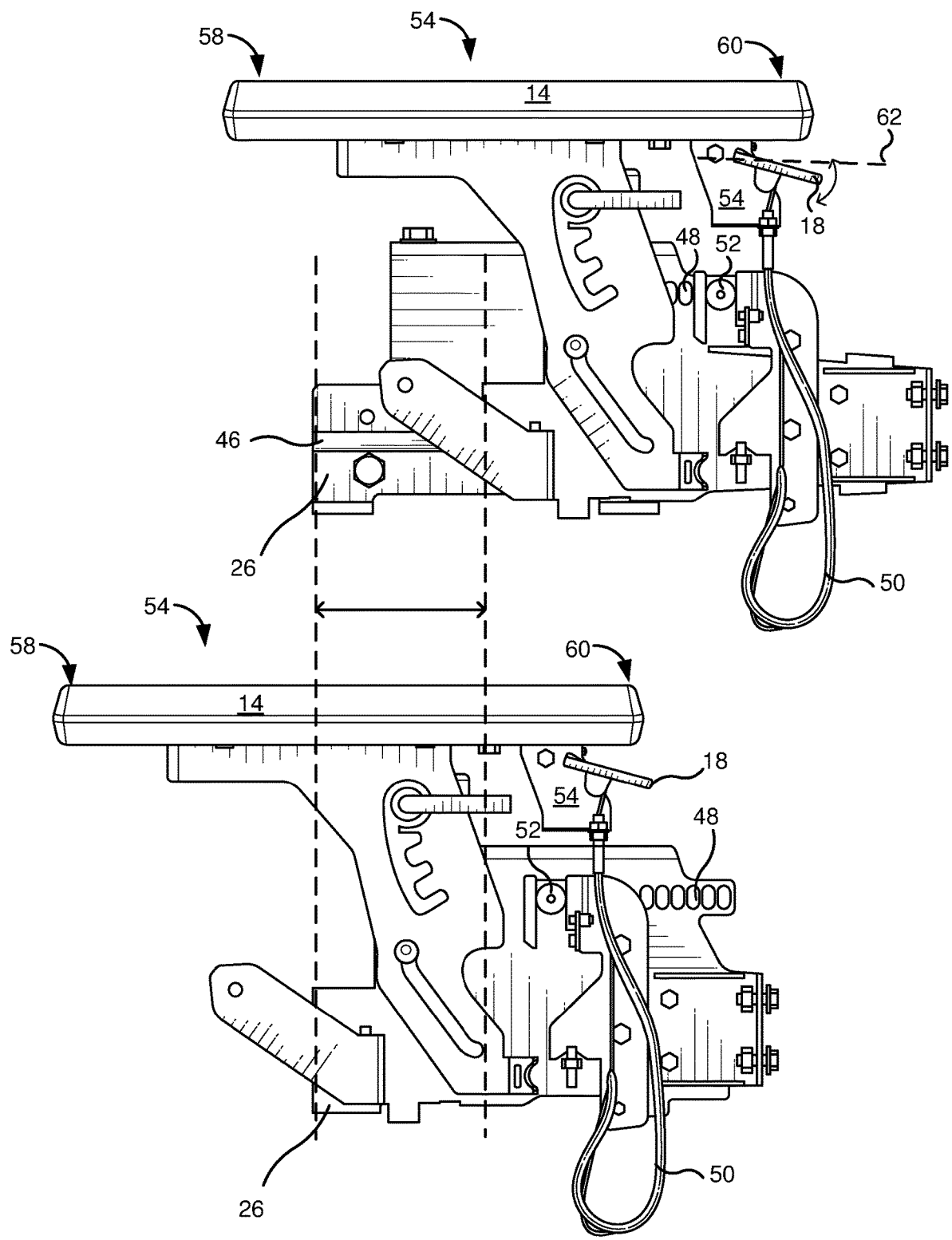
FIG. 5 is a diagram of an example actuation of the operator console of FIG. 2.

FIG. 5 is a diagram of an example actuation of the operator console of FIG. 2. The actuation of armrest 14 may be enabled by a second actuator control of operator console 12 that includes lever 18, cable 50, slide pin 52, and/or a locking bracket. As shown in FIG. 5, operator console 12 can be adjusted to multiple positions between, for example, a first position (as shown in a top portion of FIG. 5) and a second position (as shown in a bottom portion of FIG. 5). Such positions may be determined and/or defined by which linear slot 48 receives slide pin 52. For example, which linear slot 48 includes slide pin 52 may determine a horizontal position of operator console 12 relative to operator station 10.

According to some implementations, to adjust operator console 12 between the first position and the second position of FIG. 5, lever 18, when actuated (e.g., when moved upward or downward, as shown), may disengage slide pin 52 from one of the linear slots 48 to permit operator console 12 (e.g., including armrest 14 and control unit 20) to be movable toward a front of operator station 10 (e.g., toward hand end 60 or control unit 20) or a rear of operator station 10 (e.g., toward elbow end 58). Additionally, or alternatively, lever 18, when actuated, may engage slide pin 52 in a linear slot 48 to set the position of operator console 12 (e.g., including armrest 14 and control unit 20) relative to operator station 10.

As shown in FIG. 5, lever 18 may be positioned at hand end 60 (or a control end) of armrest 14. Accordingly, an operator may actuate lever 18 using a hand that is using controls of control unit 20. In some implementations, lever 18 is actuable relative to a plane of actuation 62. For example, to disengage slide pin 52, lever 18 is to be actuated to align with plane of actuation 62. As shown in FIG. 5, plane of actuation 62 may be substantially parallel to armrest 14 and may run beneath armrest 14. Furthermore, lever 18 may be positioned beneath armrest 14 to permit an operator to actuate lever 18 using a fingertip that overhangs armrest 14 and can pull up on lever 18.

FIG. 6 is a diagram illustrating an example manner in which interchangeable control units may be integrated with the mount of FIG. 4. As shown, in FIG. 6, a first control unit 64 and/or a second control unit 66 may be mounted to control mount 40. The first control unit 64 and second control unit 66 may be capable of controlling a same component of a machine, but have different ergonomic shapes and/or features. In some implementations, the first control unit 64 may be used to control a first component of a machine and the second control unit 66 may be used to control a second component of the machine. The first component and the second component may be different types components that perform one or more different operations of the machine. Additionally, or alternatively, the first control unit 64 may be used to control a first machine and the second control unit 66 may be used to control a second machine that is a different type of machine from the first machine. Accordingly, operator console 12 is capable of supporting a variety of different types of control units 20 for a variety of different types of machines.

FIG. 7 is a flowchart of an example process 700 associated with an adjustable operator console. In some implementations, one or more process blocks of FIG. 7 may be performed by and/or in connection with operator console 12.

As shown in FIG. 7, process 700 may include engaging a locking mechanism associated with an armrest bracket to set the armrest in a first position, wherein the locking mechanism is engaged in a first notch of a plurality of notches of a ratchet slot based on a first action of an actuator control (block 710). As described herein, the armrest bracket may be configured to support the armrest and include a guide slot that permits a guide pin of an armrest mount to slide within the guide slot. The guide slot may be configured to adjust a degree of tilt of the armrest based on a location of the guide pin within the guide slot. The armrest mount may support the armrest bracket via the guide pin and the locking mechanism. As described herein, the armrest bracket may include a ratchet slot that includes a plurality of notches. The first actuation may include applying a first clamping force on the locking mechanism via the first actuator control.

As further shown in FIG. 7, process 700 may include disengaging, based on a second actuation of the actuator control, the locking mechanism to permit the locking mechanism to be movable within the ratchet slot and to permit the guide pin to be movable within the guide slot (block 720). The second actuation may include releasing the first clamping force on the locking mechanism via the first actuator control As further shown in FIG. 7, process 700 may include reengaging, based on a third actuation of the actuator control, the locking mechanism in a second notch, of the plurality of notches, to set the armrest in a second position, wherein the position of the armrest is vertically different in the second position from the first position, and/or wherein the degree of tilt of the armrest is different in the second position from the first position (block 730). The third actuation may include applying a second clamping force on the locking mechanism via the first actuator control.

In some implementations, the first position corresponds to use of a first control unit, and the second position corresponds to use of a second control unit. One or more of the first control unit or the second control unit may be configured to be supported by the armrest mount.

Process 700 may include additional implementations, such as any single implementation or any combination of implementations in connection with one or more other processes described elsewhere herein. Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

As indicated above, FIGS. 1-7 are provided as examples. Other examples may differ from what is described in connection with FIGS. 1-7.

As used herein, when a first component is "connected to" a second component, the first component may be directly connected or attached to the second component or connected or attached to the second component through an intermediate component.

INDUSTRIAL APPLICABILITY

The operator console 12 may be used in any operator station 10 and/or in any machine where customization and/or modular control is desired, such as any type of operator station for a track type tractor, or any other type of operator controlled machine. The disclosed operator console 12 may provide ergonomic positioning of armrest 14 relative to control unit 20 to permit a plurality of different arm angles of an operator. Accordingly, such arm angles may be adjustable to fit a variety of shapes of control units 20 that are ergonomically designed to allow an operator to select different hand positions. In this way, potential for operator injury and/or potential harm associated with operating control unit 20 is decreased and/or eliminated.

Furthermore, armrest 14 of operator console 12 may be adjusted to include a tilt position that, for example, raises an elbow end more than a hand end of armrest 14. In this way, operator console 12 may be configured to support and/or secure a hand of an operator against control unit 20 to prevent the hand of the operator from slipping off control unit 20 or being dislodged from control unit 20. Furthermore, such advantages may prevent an accident due to the hand of the operator accidentally being separated from control unit 20 due to being unable to adjust armrest 14, as described herein.

According to some implementations, a modular nature and/or size of operator console 12 enables simplified installation, repair, replacement, and/or interchangeability between one or more machines. In this way, operator console 12 enables flexibility across multiple applications, for multiple machines.

What is claimed is:

1. An operator console comprising:
   an armrest configured to support an arm of an operator;
   a control unit configured to control a component of a machine; and
   a mount unit,
      wherein the mount unit comprises:
         a mount bracket configured to be mounted to an operator station of the machine;
         a control mount configured to support the control unit;
         an armrest bracket configured to support the armrest;
         an armrest mount configured to support the armrest bracket;
         a first actuator control configured to permit an adjustment to a position of the armrest relative to the control unit; and
         a second actuator control configured to permit an adjustment to a position of the armrest and the control unit relative to the operator station of the machine,
      wherein the control unit is a first control unit and the machine is a first machine,
      wherein the control mount is configured to support at least one of the first control unit or a second control unit,
      wherein the first control unit and the second control unit include a same control unit frame to permit the control mount to support the first control unit or the second control unit, and
      wherein the second control unit is configured to control a component of a second machine,
      wherein the first control unit is a different type of control unit from the second control unit, and
      wherein the second machine is a different type of machine than the first machine.

2. The operator console of claim 1, wherein the first actuator control permits the armrest bracket to be adjusted vertically, relative to the armrest mount and control unit.

3. The operator console of claim 1, wherein the first actuator control permits the armrest bracket to pivot relative to the control mount.

4. The operator console of claim 1, wherein the first actuator control permits the armrest bracket to be adjusted vertically, relative to the mount bracket, and apply a degree of tilt to the armrest,
   wherein the degree of tilt is based on a vertical position of the armrest bracket.

5. The operator console of claim 4, wherein the degree of tilt aligns a top surface of the armrest with a hand position of the control unit, regardless of the vertical position of the armrest bracket.

6. The operator console of claim 1, wherein the armrest bracket includes:
   a guide slot configured to permit a guide pin of the armrest mount to slide within the guide slot,
      wherein the guide slot is configured to adjust a tilt position of the armrest based on a location of the guide pin within the guide slot; and
   a ratchet slot that includes a plurality of notches to engage a locking mechanism,
      wherein the first actuator control, when actuated, engages the locking mechanism within one of the plurality of notches to set a vertical position of the armrest and the tilt position of the armrest, or
      wherein the first actuator control, when actuated, disengages the locking mechanism from one of the plurality of notches to permit the locking mechanism to be movable within the ratchet slot.

7. The operator console of claim 6, wherein the locking mechanism comprises:
   a threaded bolt that is received by an opening in the armrest mount,
      wherein, when actuated to be loosened, the threaded bolt is movable within the ratchet slot between the plurality of notches, and
      wherein, when actuated to be tightened and engaged within one or more of the plurality of notches, the threaded bolt applies a clamping force on the armrest bracket to set the vertical position and the tilt position.

8. The operator console of claim 1, wherein the second actuator control permits:
   a forward linear adjustment of the armrest and the control unit, relative to the operator station, and
   a backward linear adjustment of the armrest and control unit, relative to the operator station.

9. The operator console of claim 1, wherein the second actuator control comprises:
   a cable;
   a slide pin, attached to a locking end of the cable, configured to be received in one or more of a plurality of linear slots of the mount bracket; and
   a lever connected to a lever end of the cable,
      wherein the lever, when actuated, is configured to disengage the slide pin from one of the plurality of linear slots to permit the armrest and the control unit to be movable toward a front of the operator station or a rear of the operator station, or
      wherein the lever, when actuated, is configured to engage the slide pin in one of the plurality of linear slots to set the position of the armrest and the control unit relative to the operator station.

10. The operator console of claim 1, wherein the control unit is a first control unit and the component is a first component,
    wherein the control mount is configured to support at least one of the first control unit or a second control unit,
    wherein the first control unit and the second control unit include a same control unit frame to permit the control mount to support the first control unit or the second control unit, and
    wherein the second control unit is configured to control a second component of the machine,
       wherein the first control unit is a different type of control unit from the second control unit, and
       wherein the second component is a different type of component than the first component.

11. The operator console of claim 1, further comprising:
    a mount housing, configured to enclose the control mount, the armrest bracket, the armrest mount, and a control unit frame of the control unit, wherein the control mount is configured to be fastened to the control unit frame.

12. A mount for an operator console, comprising:
a mount bracket configured to be mounted to an operator station of a machine;
a control mount configured to support a control unit, wherein the control unit is configured to control an operation of a component of the machine;
an armrest bracket configured to support the armrest;
an armrest mount configured to support the armrest bracket;
a first actuator control configured to permit an adjustment to a position of the armrest relative to the control mount; and
a second actuator control configured to permit an adjustment to a position of the armrest and the control unit relative to the operator station of the machine,
wherein the control unit is a first control unit and the machine is a first machine,
wherein the control mount is configured to support at least one of the first control unit or a second control unit,
wherein the first control unit and the second control unit include a same control unit frame to permit the control mount to support the first control unit or the second control unit, and
wherein the second control unit is configured to control a component of a second machine,
wherein the first control unit is a different type of control unit from the second control unit, and
wherein the second machine is a different type of machine than the first machine.

13. The mount of claim 12, wherein the control unit is one of a plurality of different types of control units that are capable of a being supported by the control mount.

14. The mount of claim 12, wherein the second actuator control comprises:
a cable;
a slide pin, attached to a locking end of the cable configured to be received in one or more of a plurality of linear slots of the mount bracket; and
a lever connected to a lever end of the cable,
wherein the lever, when actuated, is configured to disengage the slide pin from one of the plurality of linear slots to permit the armrest and the control unit to be movable toward a front of the operator station or a rear of the operator station, or
wherein the lever, when actuated, is configured to engage the slide pin in one of the plurality of linear slots to set the position of the armrest and control unit relative to the operator station.

15. The mount of claim 14, wherein the lever is positioned at a control end of the armrest,
wherein the lever is actuable relative to a plane of actuation,
wherein the plane of actuation is substantially parallel to the armrest and beneath the armrest.

16. A method for adjusting a position of an armrest of an operator console, the method comprising:
engaging a locking mechanism associated with an armrest bracket to set the armrest in a first position,
wherein the armrest bracket is configured to support the armrest,
wherein the armrest bracket comprises:
a guide slot configured to permit a guide pin of an armrest mount to slide within the guide slot,
wherein the guide slot is configured to adjust a degree of tilt of the armrest based on a location of the guide pin within the guide slot, and
wherein the armrest mount supports the armrest bracket via the guide pin and the locking mechanism; and
a ratchet slot that includes a plurality of notches, and
wherein the locking mechanism is engaged in a first notch of the plurality of notches based on a first actuation of an actuator control;
disengaging, based on a second actuation of the actuator control, the locking mechanism to permit the locking mechanism to be movable within the ratchet slot and to permit the guide pin to be movable within the guide slot; and
reengaging, based on a third actuation of the actuator control, the locking mechanism in a second notch, of the plurality of notches, to set the armrest in a second position,
wherein the position of the armrest is vertically different in the second position from the first position, and
wherein the degree of tilt of the armrest is different in the second position from the first position.

17. The method of claim 16, wherein the first actuation comprises applying a first clamping force on the locking mechanism via the actuator control,
wherein the second actuation comprises releasing the first clamping force on the locking mechanism via the actuator control, and
wherein the third actuation comprises applying a second clamping force on the locking mechanism via the actuator control.

18. The method of claim 16, wherein the first position corresponds to use of a first control unit and the second position corresponds to use of a second control unit,
wherein one or more of the first control unit or the second control unit are configured to be supported by the armrest mount.

* * * * *